US 12,181,153 B2

(12) United States Patent
Dai

(10) Patent No.: US 12,181,153 B2
(45) Date of Patent: Dec. 31, 2024

(54) FUEL INJECTOR ASSEMBLY FOR GAS TURBINE ENGINE

(71) Applicant: Raytheon Technologies Corporation, Farmington, CT (US)

(72) Inventor: Zhongtao Dai, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/113,457

(22) Filed: Feb. 23, 2023

(65) Prior Publication Data

US 2024/0288168 A1    Aug. 29, 2024

(51) Int. Cl.
  *F23R 3/14*    (2006.01)
  *F02C 3/22*    (2006.01)
  *F23R 3/28*    (2006.01)
  *F23R 3/60*    (2006.01)

(52) U.S. Cl.
  CPC ............... *F23R 3/286* (2013.01); *F02C 3/22* (2013.01); *F23R 3/14* (2013.01); *F23R 3/60* (2013.01)

(58) Field of Classification Search
  None
  See application file for complete search history.

(56) References Cited

U.S. PATENT DOCUMENTS

| | | | | |
|---|---|---|---|---|
| 3,713,588 A * | 1/1973 | Sharpe | ................... | F23D 11/107 239/431 |
| 3,937,011 A * | 2/1976 | Caruel | ................... | F23D 11/107 239/404 |
| 5,351,477 A * | 10/1994 | Joshi | ................... | F23D 17/002 60/737 |
| 5,431,019 A * | 7/1995 | Myers | ................... | F23C 7/002 239/404 |
| 5,603,211 A * | 2/1997 | Graves | ................... | F23R 3/14 60/776 |
| 7,631,500 B2 * | 12/2009 | Mueller | ................... | F23R 3/286 60/737 |
| 9,115,896 B2 * | 8/2015 | Abdel-Hafez | .......... | F23C 7/004 |
| 9,435,537 B2 * | 9/2016 | ELKady | ................... | F23R 3/14 |
| 11,131,460 B2 | 9/2021 | Muldal | | |

(Continued)

OTHER PUBLICATIONS

Arthur H. Lefebvre, Dilip R. Ballal, Gas Turbine Combustion, Alternate Fuels and Emissions, 2010, CRC Press, pp. 244-245. (Year: 2010).*

(Continued)

*Primary Examiner* — Todd E Manahan
*Assistant Examiner* — Marc Amar
(74) *Attorney, Agent, or Firm* — Getz Balich LLC

(57) ABSTRACT

An assembly is provided for a turbine engine. This turbine engine assembly includes a fuel injector assembly, and the fuel injector assembly includes an inner air swirler and a fuel swirler. The inner air swirler is configured to swirl inner air in a direction about an axis to provide inner swirled air. The fuel injector assembly is configured to inject the inner swirled air as an inner air flow along an inner air flow trajectory parallel with the axis. The fuel swirler is configured to swirl fuel in the direction about the axis to provide swirled fuel. The fuel injector assembly is configured to inject the swirled fuel as an annular fuel flow along a fuel flow trajectory parallel with the axis. The annular fuel flow is adjacent and circumscribes the inner air flow.

16 Claims, 11 Drawing Sheets

(56) References Cited

U.S. PATENT DOCUMENTS

| | | | |
|---|---|---|---|
| 11,339,967 B2 | 5/2022 | Tentorio | |
| 11,428,412 B2 | 8/2022 | Tentorio | |
| 12,038,177 B1* | 7/2024 | Kramer | F02C 3/30 |
| 2007/0137207 A1 | 6/2007 | Mancini | |
| 2008/0163627 A1* | 7/2008 | ELKady | F23R 3/14 |
| | | | 60/737 |
| 2008/0173019 A1 | 7/2008 | Kobayashi | |
| 2009/0224080 A1* | 9/2009 | Chew | F23R 3/14 |
| | | | 239/589 |
| 2010/0212322 A1 | 8/2010 | York | |
| 2010/0251720 A1* | 10/2010 | Pelletier | F23D 11/107 |
| | | | 60/740 |
| 2011/0108639 A1* | 5/2011 | Hicks | F23D 11/383 |
| | | | 239/501 |
| 2012/0304649 A1 | 12/2012 | Matsuyama | |
| 2018/0128172 A1* | 5/2018 | Allam | F02C 3/34 |
| 2019/0170355 A1 | 6/2019 | Tentorio | |
| 2022/0099290 A1* | 3/2022 | Stockill | F23D 11/383 |
| 2022/0372915 A1* | 11/2022 | Gandikota | F23R 3/28 |

OTHER PUBLICATIONS

EP Search Report for EP Patent Application No. 24159228.6 dated Jun. 17, 2024.

* cited by examiner

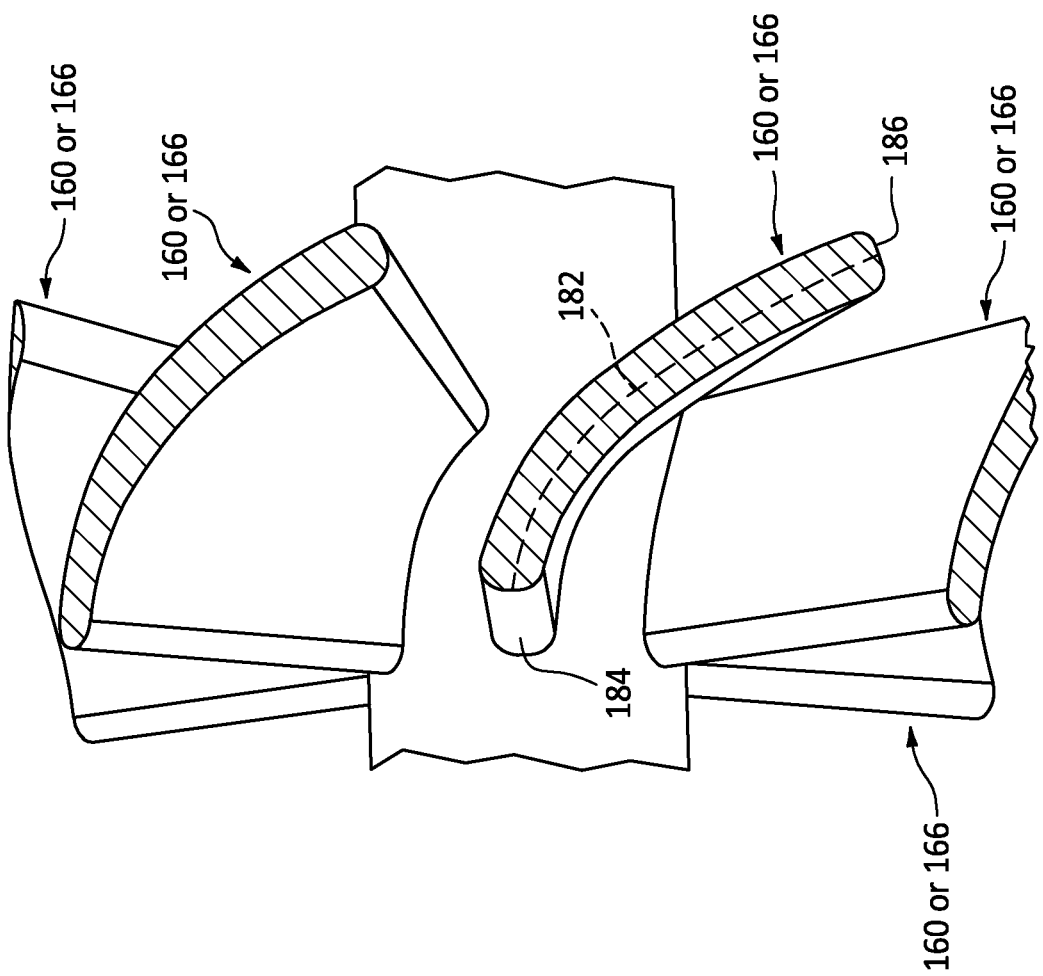

FUEL INJECTOR ASSEMBLY FOR GAS TURBINE ENGINE

BACKGROUND OF THE DISCLOSURE

1. Technical Field

This disclosure relates generally to a gas turbine engine and, more particularly, to a fuel injector assembly for the gas turbine engine.

2. Background Information

Various types and configurations of fuel injector assemblies are known in the art. Some of these known fuel injector assemblies include an air swirler mated with a fuel injector nozzle. While these known fuel injector assemblies have various advantages, there is still room in the art for improvement particularly when used with fast burning fuels such as hydrogen fuel.

SUMMARY OF THE DISCLOSURE

According to an aspect of the present disclosure, an assembly is provided for a turbine engine. This turbine engine assembly includes a fuel injector assembly, and the fuel injector assembly includes an inner air swirler and a fuel swirler. The inner air swirler is configured to swirl inner air in a direction about an axis to provide inner swirled air. The fuel injector assembly is configured to inject the inner swirled air as an inner air flow along an inner air flow trajectory parallel with the axis. The fuel swirler is configured to swirl fuel in the direction about the axis to provide swirled fuel. The fuel injector assembly is configured to inject the swirled fuel as an annular fuel flow along a fuel flow trajectory parallel with the axis. The annular fuel flow is adjacent and circumscribes the inner air flow.

According to another aspect of the present disclosure, another assembly is provided for a turbine engine. This turbine engine assembly includes a hydrogen fuel source and a fuel injector. The fuel injector is configured to receive hydrogen fuel from the hydrogen fuel source. The fuel injector includes an air passage, a fuel passage and a fuel swirler within the fuel passage. The air passage extends axially along an axis within the fuel injector to an air passage outlet. The air passage is configured to direct inner air out of the fuel injector through the air passage outlet. The fuel swirler is configured to swirl the hydrogen fuel to provide swirled hydrogen fuel. The fuel passage extends axially along the axis within the fuel injector to a fuel passage outlet. The fuel passage is configured to direct the swirled hydrogen fuel out of the fuel injector through the fuel passage outlet. The fuel passage is radially adjacent and circumscribes the air passage.

According to still another aspect of the present disclosure, another assembly is provided for a turbine engine. This turbine engine assembly includes a fuel injector, and the fuel injector includes an air passage, a fuel passage and a fuel swirler within the fuel passage. The air passage extends axially along an axis within the fuel injector to an air passage outlet. The air passage is configured to direct inner air out of the fuel injector through the air passage outlet. The fuel swirler is configured to swirl fuel to provide swirled fuel. The fuel passage extends axially along the axis within the fuel injector to a fuel passage outlet. The fuel passage is configured to direct the swirled fuel out of the fuel injector through the fuel passage outlet. The fuel passage outlet is axially aligned with and circumscribes the air passage outlet.

The fuel injector may also include an inner air swirler. The inner air swirler may be configured to swirl the inner air to provide swirled inner air. The air passage may be configured to direct the swirled inner air out of the fuel injector through the air passage outlet.

The air passage may be configured to direct the inner air out of the fuel injector through the air passage outlet along a first trajectory. The fuel passage may be configured to direct the swirled hydrogen fuel out of the fuel injector through the fuel passage outlet along a second trajectory that is substantially parallel with the first trajectory when viewed in a plane parallel with the axis.

The inner air swirler may be configured as or otherwise include an axial air swirler.

The inner air flow may be an annular inner air flow.

The fuel injector assembly may also include a center body and a nozzle wall circumscribing the center body. The inner air swirler may include a plurality of air swirler vanes arranged circumferentially about the axis. Each of the air swirler vanes may extend radially from the center body to the nozzle wall.

An inner bore may extend axially through the center body.

A camber line of a first of the air swirler vanes may be straight.

At least a portion of a camber line of a first of the air swirler vanes may be curved.

The fuel swirler may be configured as or otherwise include an axial fuel swirler.

The fuel injector assembly may also include a nozzle inner wall and a nozzle outer wall circumscribing the nozzle inner wall. The fuel swirler may include a plurality of fuel swirler vanes arranged circumferentially about the axis. Each of the fuel swirler vanes may extend radially from the nozzle inner wall to the nozzle outer wall.

A camber line of a first of the fuel swirler vanes may be straight.

At least a portion of a camber line of a first of the fuel swirler vanes may be curved.

The fuel injector assembly may also include an air passage and a fuel passage. The air passage may extend axially within the fuel injector assembly to an air passage outlet. The fuel injector assembly may be configured to inject the inner swirled air as the inner air flow out of the air passage outlet along the inner air flow trajectory. The fuel passage may extend axially within the fuel injector assembly to a fuel passage outlet that is axially aligned with the air passage outlet. The fuel injector assembly may be configured to inject the swirled fuel as the annular fuel flow out of the fuel passage outlet along the fuel flow trajectory.

The fuel injector assembly may also include an outer air swirler. The outer air swirler may be configured to swirl outer air in the direction about the axis to provide outer swirled air. The fuel injector assembly may be configured to inject the outer swirled air as an annular outer air flow along the axis. The annular outer air flow may be adjacent and circumscribe the annular fuel flow.

The outer air swirler may be configured as or otherwise include a radial air swirler.

The fuel injector assembly may also include a first swirler wall and a second swirler wall. The outer air swirler may include a plurality of air swirler vanes arranged circumferentially about the axis. Each of the air swirler vanes may extend axially from the first swirler wall to the second swirler wall.

The assembly may also include a hydrogen fuel source configured to provide the fuel to the fuel injector assembly such that the fuel swirled by the fuel swirler is hydrogen fuel.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIG. 8 is a perspective illustration of a portion of the injector nozzle with helical swirler vanes.

DETAILED DESCRIPTION

Figure 1:
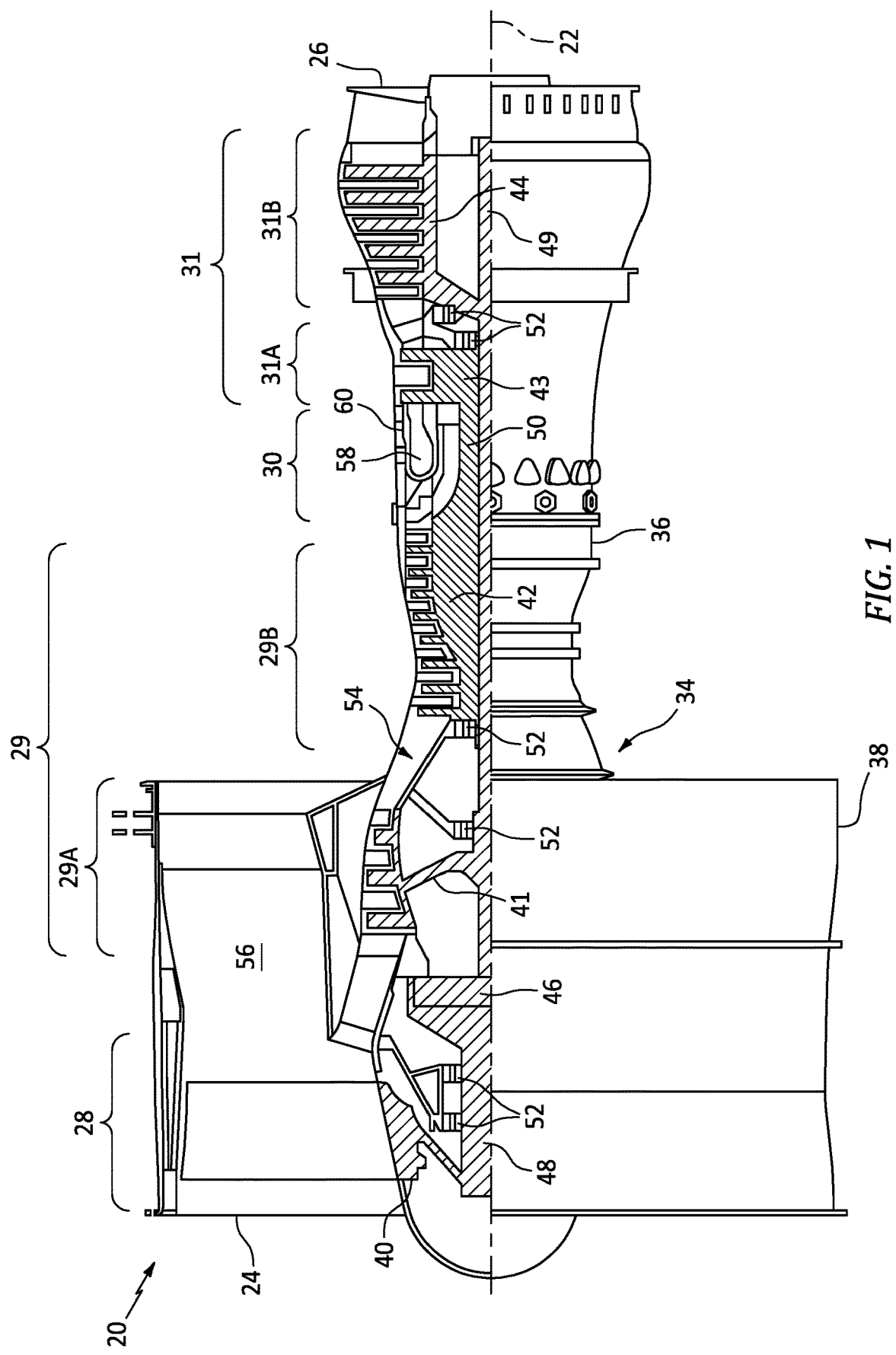
FIG. 1 is a side cutaway illustration of a geared turbine engine.

FIG. 1 is a side cutaway illustration of a geared gas turbine engine 20. This gas turbine engine 20 extends along an axial centerline 22 between an upstream airflow inlet 24 and a downstream airflow exhaust 26. The gas turbine engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B.

The engine sections 28-31B are arranged sequentially along the axial centerline 22 within an engine housing 34. This engine housing 34 includes an inner case 36 (e.g., a core case) and an outer case 38 (e.g., a fan case). The inner case 36 may house one or more of the engine sections 29A, 29B, 30, 31A and 31B; e.g., a core of the gas turbine engine 20. The outer case 38 may house at least the fan section 28.

Each of the engine sections 28, 29A, 29B, 31A and 31B includes a respective bladed rotor 40-44. Each of these bladed rotors 40-44 includes a plurality of rotor blades arranged circumferentially around and connected to one or more respective rotor disks and/or hubs. The rotor blades, for example, may be formed integral with or mechanically fastened, welded, brazed, adhered and/or otherwise attached to the respective rotor disk(s) and/or the respective hub(s).

The fan rotor 40 is connected to a geartrain 46, for example, through a fan shaft 48. The geartrain 46 and the LPC rotor 41 are connected to and driven by the LPT rotor 44 through a low speed shaft 49. The HPC rotor 42 is connected to and driven by the HPT rotor 43 through a high speed shaft 50. The engine shafts 48-50 are rotatably supported by a plurality of bearings 52; e.g., rolling element and/or thrust bearings. Each of these bearings 52 is connected to the engine housing 34 by at least one stationary structure such as, for example, an annular support strut.

During engine operation, air enters the gas turbine engine 20 through the airflow inlet 24. This air is directed through the fan section 28 and into a core flowpath 54 and a bypass flowpath 56. The core flowpath 54 extends sequentially through the engine sections 29A-31B; e.g., the engine core. The air within the core flowpath 54 may be referred to as "core air". The bypass flowpath 56 extends through a bypass duct, and bypasses the engine core. The air within the bypass flowpath 56 may be referred to as "bypass air".

The core air is compressed by the LPC rotor 41 and the HPC rotor 42 and directed into a (e.g., annular) combustion chamber 58 of a (e.g., annular) combustor 60 in the combustor section 30. Fuel is injected into the combustion chamber 58 and mixed with the compressed core air to provide a fuel-air mixture. This fuel-air mixture is ignited and combustion products thereof flow through and sequentially cause the HPT rotor 43 and the LPT rotor 44 to rotate. The rotation of the HPT rotor 43 and the LPT rotor 44 respectively drive rotation of the HPC rotor 42 and the LPC rotor 41 and, thus, compression of the air received from an inlet to the core flowpath 54. The rotation of the LPT rotor 44 also drives rotation of the fan rotor 40, which propels bypass air through and out of the bypass flowpath 56. The propulsion of the bypass air may account for a majority of thrust generated by the gas turbine engine 20.

Figure 2:
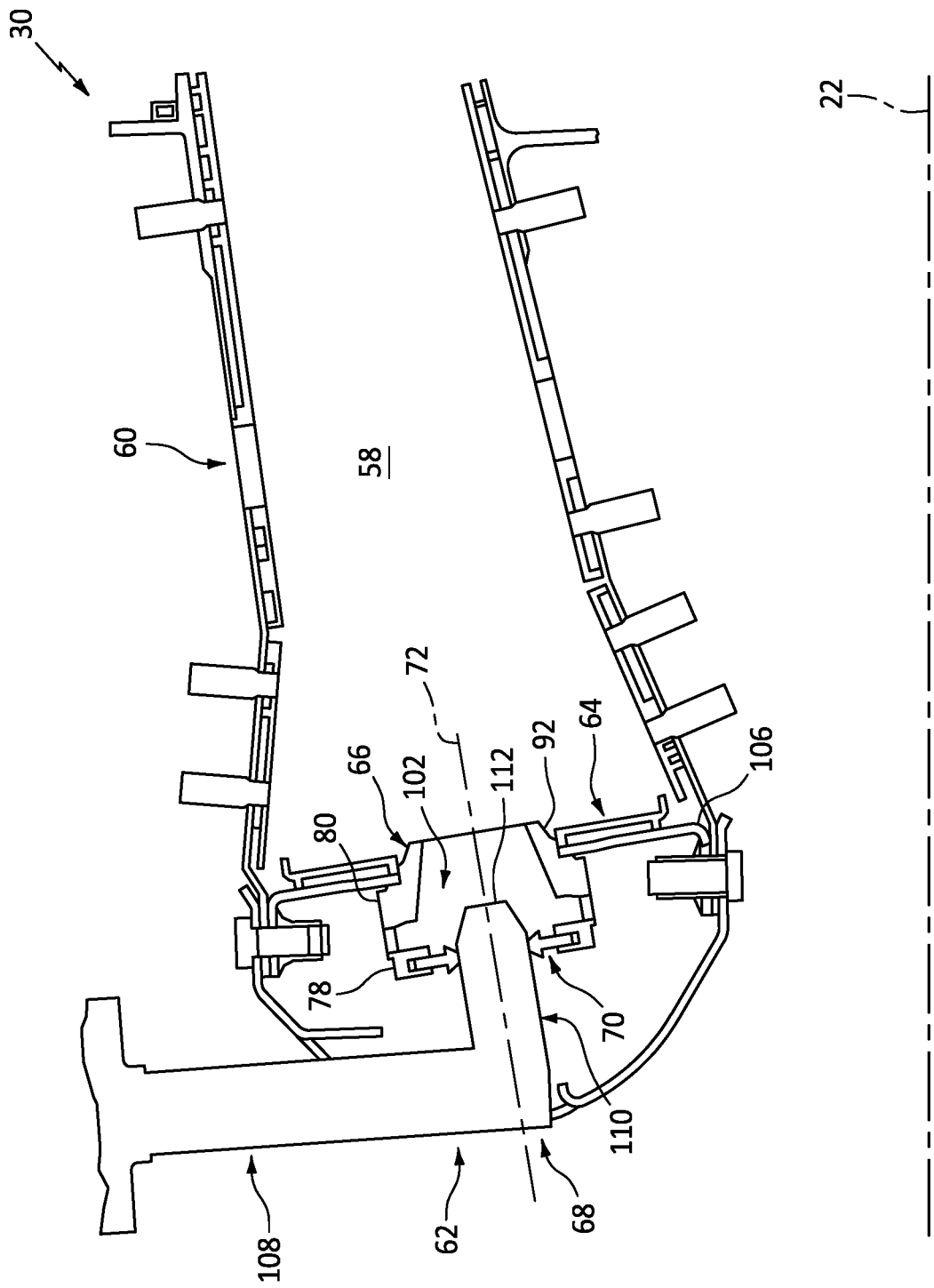
FIG. 2 is a partial side sectional illustration of a combustor with a fuel injector assembly.

Referring to FIG. 2, the combustor section 30 includes a plurality of fuel injector assemblies 62 (one visible in FIG. 2) arranged circumferentially about the axial centerline 22 in a circular array. The fuel injector assemblies 62 are mounted to a (e.g., annular) bulkhead 64 of the combustor 60. The fuel injector assemblies 62 are configured to direct a mixture of fuel and compressed air into the combustion chamber 58 for combustion. Each fuel injector assembly 62 of FIG. 2 includes an air swirler assembly 66 and a fuel injector 68. The fuel injector assembly 62 may also include an injector nozzle guide 70 coupling the fuel injector 68 to the swirler assembly 66.

Figure 3:
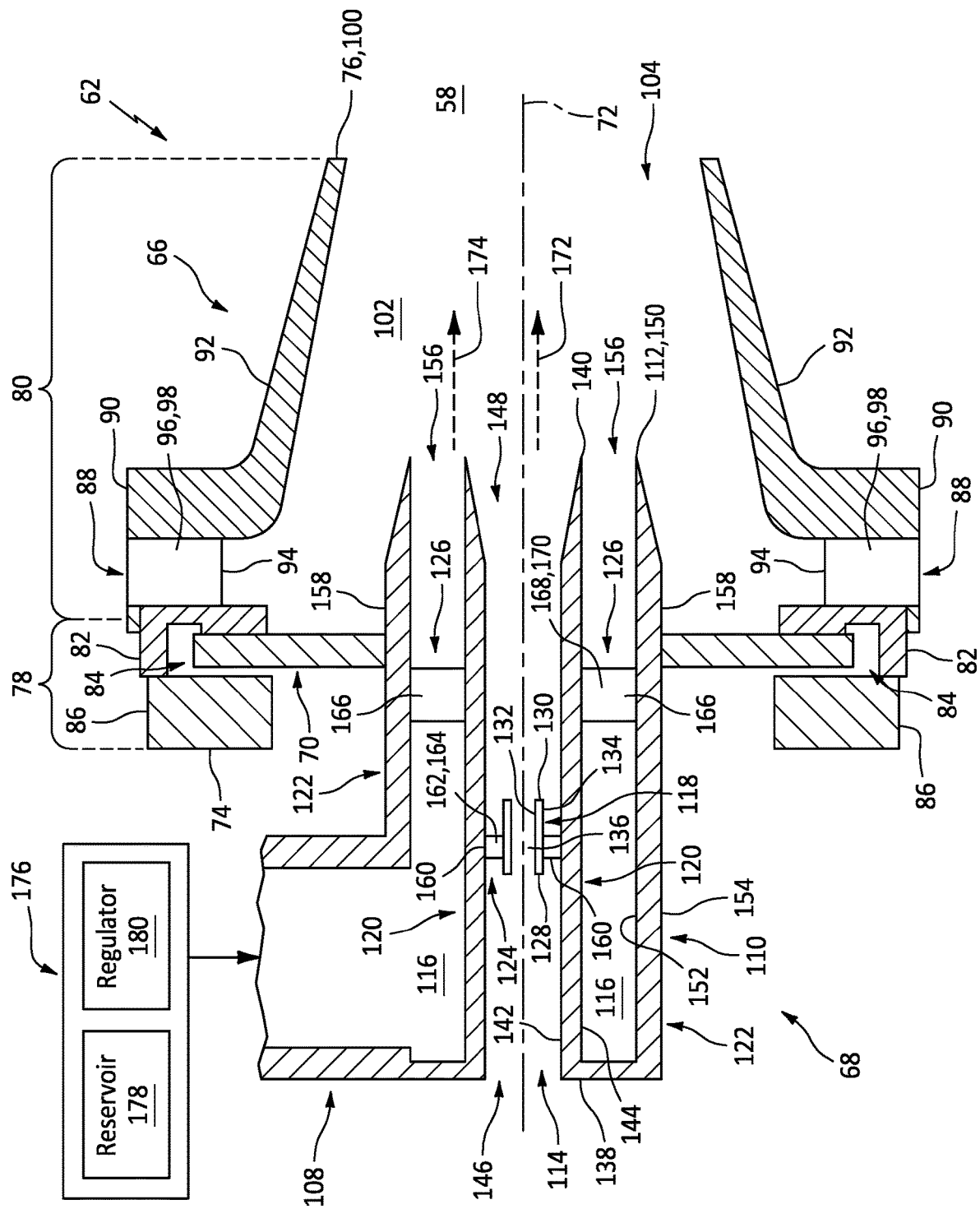
FIG. 3 is a partial side sectional illustration of the fuel injector assembly of FIG. 2.

Referring to FIG. 3, the swirler assembly 66 extends circumferentially around an axis 72 (e.g., a centerline of the swirler assembly 66) providing the swirler assembly 66 with a full-hoop body. The swirler assembly 66 extends axially along the axis 72 from an upstream end 74 of the swirler assembly 66 to a downstream end 76 of the swirler assembly 66. The swirler assembly 66 may include a base section 78 and a swirler section 80.

The base section 78 is disposed at (e.g., on, adjacent or proximate) the swirler upstream end 74. This base section 78 may be configured as or otherwise include a first swirler wall 82; e.g., an annular upstream swirler wall. The base section 78 may also be configured to form a receptacle 84 (e.g., a slot, a channel, etc.) for the nozzle guide 70 at the swirler upstream end 74. The base section 78 of FIG. 3, for example, also includes a mounting plate 86 axially abutted against and attached to the first swirler wall 82. The receptacle 84 is formed at an inner periphery of the base section 78, axially between a (e.g., annular) surface of the first swirler wall 82 and a (e.g., annular) surface of the mounting plate 86. The receptacle 84 is configured to receive the nozzle guide 70, and (e.g., loosely) capture the nozzle guide 70 axially between the first swirler wall 82 and the mounting plate 86. This capturing of the nozzle guide 70 between the first swirler wall 82 and the mounting plate 86 may allow the nozzle guide 70 to radially float (e.g., shift) within the receptacle 84. This floating may in turn accommodate slight shifting between the swirler assembly 66 and the fuel injector 68 during gas turbine engine operation. Of course, various other techniques are known in the art for arranging and/or securing an injector mount with a swirler assembly, and the present disclosure is not limited to any particular ones thereof. Furthermore, it is contemplated the nozzle guide 70 may alternatively be fixed to the swirler assembly 66 where, for example, the swirler assembly 66 is operable to shift relative to the combustor bulkhead 64 (see FIG. 2).

The swirler section 80 includes an outer air swirler 88 and a second swirler wall 90; e.g., an annular downstream swirler wall. The swirler section 80 of FIG. 3 also includes a swirler guide wall 92; e.g., a tubular funnel wall.

Figure 4:
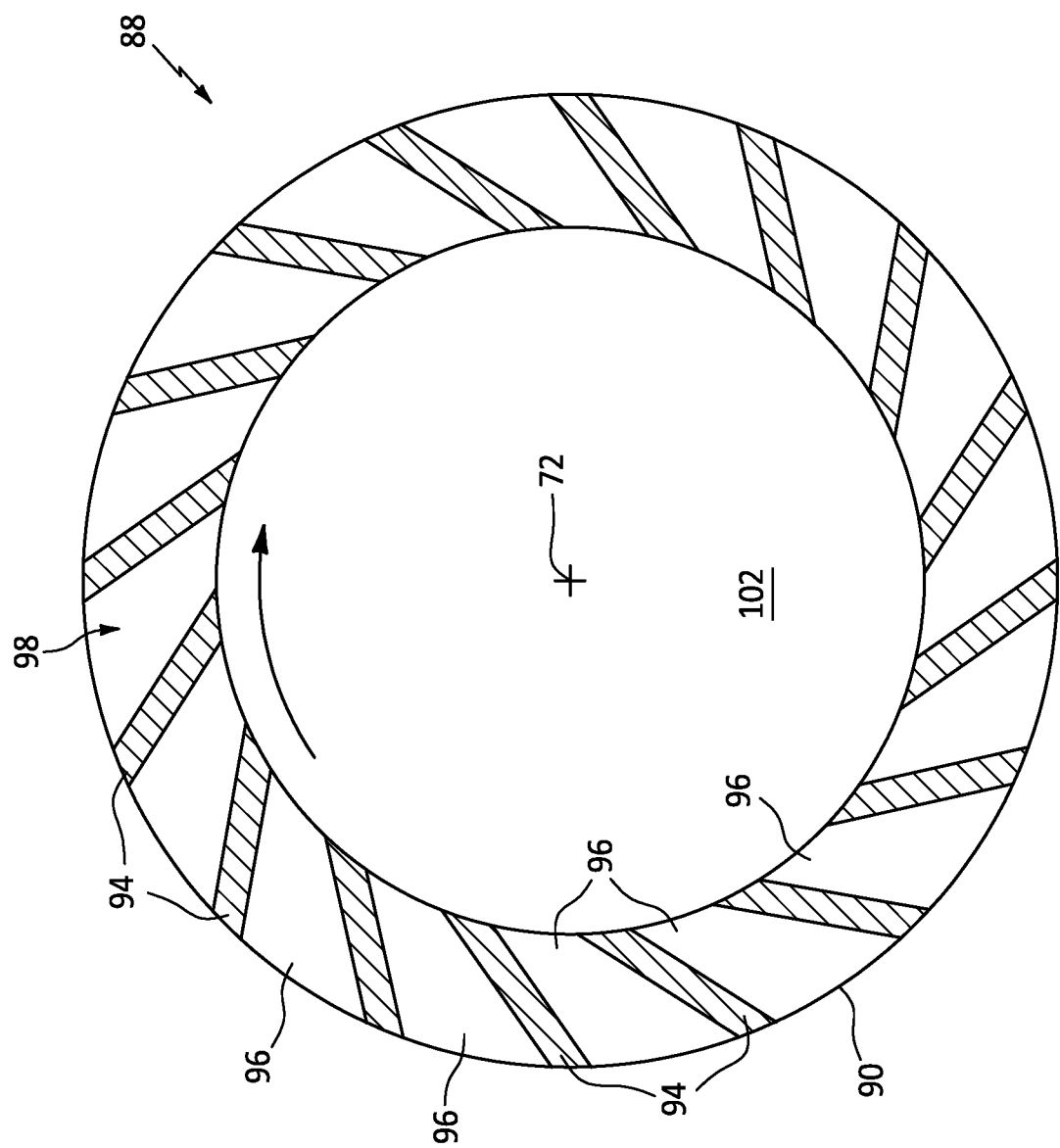
FIG. 4 is a cross-sectional illustration of an air swirler assembly through an air swirler.

The outer air swirler 88 may be configured as a radial air swirler. The outer air swirler 88 of FIG. 3, for example, is arranged axially between and is connected to the first swirler wall 82 and the second swirler wall 90. The outer air swirler 88 of FIG. 4 includes a plurality of outer air swirler vanes 94. Each of these outer air swirler vanes 94 extends axially between and is connected to the first swirler wall 82 and the second swirler wall 90 (see FIG. 3). The outer air swirler vanes 94 are arranged circumferentially about the axis 72 in a circular array. Each of the outer air swirler vanes 94 is circumferentially separated from each circumferentially neighboring (e.g., adjacent) air swirler vane 94 by a respective outer air swirler channel 96; e.g., an air gap. Each outer air swirler channel 96 extends circumferentially between and to a respective circumferentially neighboring pair of the outer air swirler vanes 94. Each outer air swirler channel 96 extends axially between and to the first swirler wall 82 and the second swirler wall 90 (see FIG. 3). With this arrangement, the outer air swirler channels 96 collectively form an outer air swirler passage 98 radially through the outer air swirler 88, axially between the swirler walls 82 and 90 (see FIG. 3). The outer air swirler vanes 94/the outer air swirler channels 96 are configured such that air passing through and out of the outer air swirler passage 98 is directed in a first circumferential direction (e.g., a clockwise direction, or alternatively a counterclockwise direction) about the axis 72. In other words, the outer air swirler vanes 94/the outer air swirler channels 96 are operable to circumferentially swirl the air passing through the outer air swirler 88 in the first circumferential direction.

Referring to FIG. 3, the swirler guide wall 92 is disposed at the swirler downstream end 76. The swirler guide wall 92 of FIG. 3, for example, is connected to (and cantilevered from) the second swirler wall 90 at an inner end of the outer air swirler 88. This swirler guide wall 92 projects out from the second swirler wall 90 and extends axially along the axis 72 to a (e.g., downstream) distal end 100 of the swirler guide wall 92 at the swirler downstream end 76. As the swirler guide wall 92 extends towards (e.g., to) the swirler downstream end 76, the swirler guide wall 92 may (e.g., continuously or incrementally) radially taper inwards towards the axis 72. The swirler guide wall 92 may thereby have a tubular frustoconical geometry.

The swirler assembly 66 of FIG. 3 is further configured with an inner swirler passage 102. This inner swirler passage 102 is formed by an inner bore of the swirler assembly 66. An outer peripheral boundary of an upstream portion of the inner swirler passage 102, for example, may be formed by and radially within the base section 78 and its first swirler wall 82. An outer peripheral boundary of a downstream portion of the inner swirler passage 102 may be formed by and radially within the swirler section 80 and its swirler guide wall 92. The inner swirler passage 102 of FIG. 3 extends axially within the swirler assembly 66 from (or about) a side of the nozzle guide 70 to an inner swirler outlet 104 (e.g., an outlet orifice) at the swirler downstream end 76.

Referring to FIG. 2, the swirler assembly 66 may be mated with the combustor bulkhead 64. The swirler guide wall 92, for example, may project axially into or through a respective port in the combustor bulkhead 64. The swirler assembly 66 may also be mounted to the combustor bulkhead 64. For example, the swirler segment 80 (e.g., the second swirler wall 90 and/or the swirler guide wall 92 of FIG. 3) may be bonded (e.g., brazed or welded) and/or otherwise connected to the combustor bulkhead 64 and, more particularly, a shell 106 of the combustor bulkhead 64. However, various other techniques are known in the art for mounting a swirler assembly to a combustor bulkhead (or various other combustor components), and the present disclosure is not limited to any particular ones thereof.

The fuel injector 68 of FIG. 2 includes a fuel injector stem 108 and a fuel injector nozzle 110. The injector stem 108 is configured to support and route fuel to the injector nozzle 110. The injector nozzle 110 is cantilevered from the injector stem 108. The injector nozzle 110 projects along the axis 72 (e.g., a centerline of the injector nozzle 110) partially into the inner bore of the swirler assembly 66. A tip 112 of the injector nozzle 110 is thereby disposed within the inner swirler passage 102. Here, the nozzle tip 112 is axially spaced from the inner swirler outlet 104 by an axial distance along the axis 72.

Referring to FIG. 3, the injector nozzle 110 is configured with a nozzle air passage 114 and a nozzle fuel passage 116. The injector nozzle 110 of FIG. 3, for example, includes a nozzle center body 118, a nozzle inner wall 120 and a nozzle outer wall 122. The injector nozzle 110 of FIG. 3 also includes an inner air swirler 124 and a fuel swirler 126.

Figure 5:
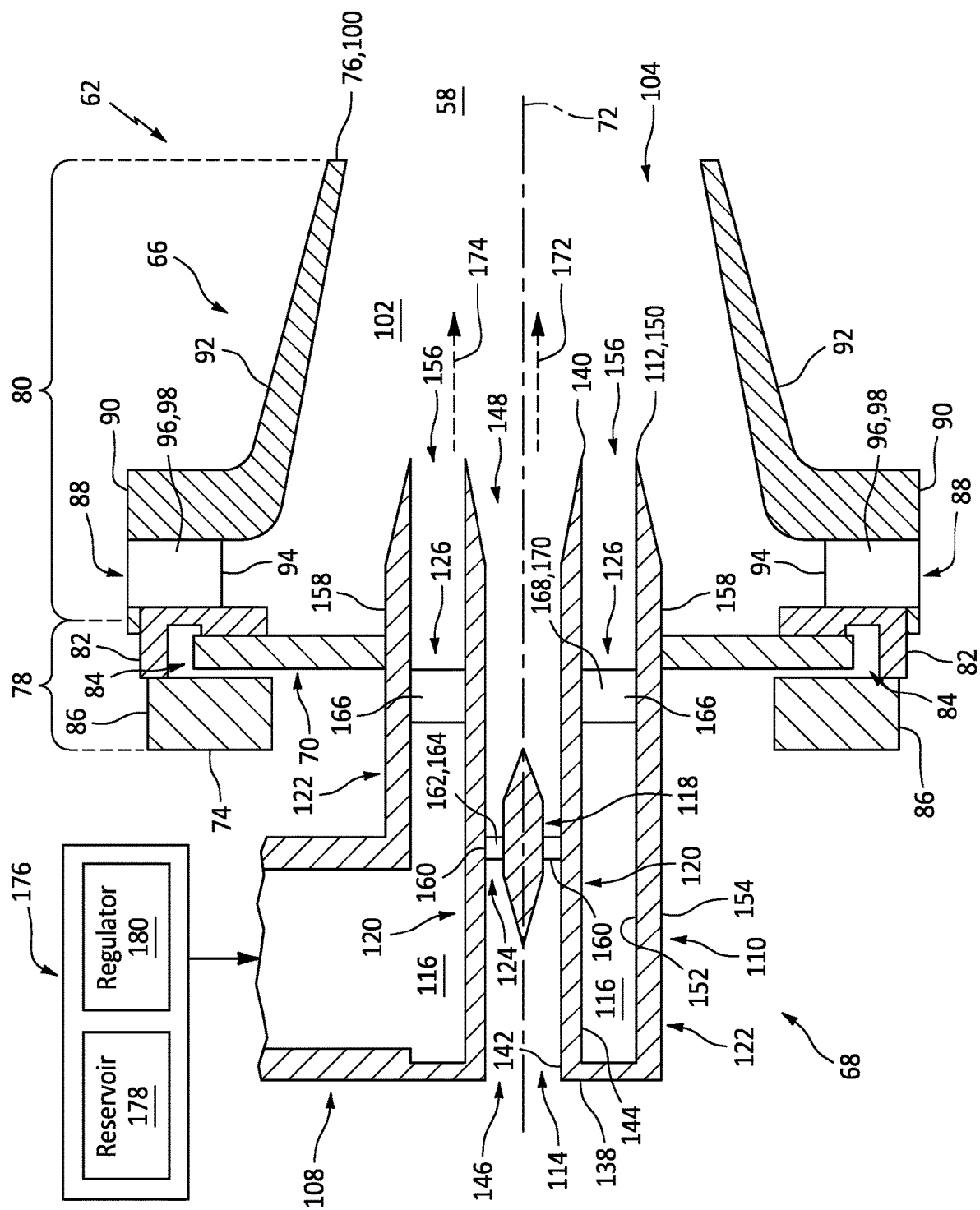
FIG. 5 is a partial side sectional illustration of the fuel injector assembly of FIG. 2 with a solid center body.

The center body 118 is disposed within the nozzle air passage 114. The center body 118 extends axially along the axis 72 between and to an upstream end 128 of the center body 118 and a downstream end 130 of the center body 118. The center body 118 may be configured as a tubular center body. A tubular sidewall of the center body 118 of FIG. 3, for example, extends radially between and to an inner side 132 of the center body 118 and an outer side 134 of the center body 118. The body inner side 132 may form an outer peripheral boundary of an inner bore 136 axially through the center body 118. More particularly, the inner bore 136 of the center body 118 of FIG. 3 extends axially along the axis 72 through the center body 118 from an inlet into the inner bore 136 at the body upstream end 128 to an outlet from the inner bore 136 at the body downstream end 130. The center body 118 and its sidewall extend circumferentially about (e.g., completely around) the axis 72 providing the center body 118 and its sidewall with a full-hoop (e.g., tubular) body. The present disclosure, however, is not limited to such an exemplary center body configuration. The center body 118 of FIG. 5, for example, is configured as a solid (e.g., non-apertured) center body without the inner bore 136 of FIG. 3.

Referring to FIG. 3, the nozzle inner wall 120 extends axially along the axis 72 between and to an upstream end 138 of the nozzle inner wall 120 and a downstream end 140 of the nozzle inner wall 120. The inner wall downstream end 140 may be axially aligned with the nozzle tip 112 along the axis 72. The body upstream end 128, by contrast, is axially recessed from the inner wall upstream end 138, and the body downstream end 130 is axially recessed from the nozzle tip 112 and/or the inner wall downstream end 140. The nozzle inner wall 120 extends radially between and to an inner side 142 of the nozzle inner wall 120 and an outer side 144 of the nozzle inner wall 120. The inner wall inner side 142 of FIG. 3 at least partially or completely forms an outer peripheral boundary of the nozzle air passage 114; e.g., a central nozzle passage. The nozzle inner wall 120 may also form an inlet 146 (e.g., an inlet orifice) to the nozzle air passage 114 and an outlet 148 (e.g., an outlet orifice) from the nozzle air passage 114. The air passage inlet 146 is disposed at the inner wall upstream end 138. The air passage outlet 148 is disposed at the inner wall downstream end 140 and/or the nozzle tip 112. The inner wall outer side 144 or FIG. 3 at least partially or completely forms an inner peripheral boundary of the nozzle fuel passage 116. The nozzle inner wall 120 extends circumferentially around the axis 72 providing the nozzle inner wall 120 with a full-hoop (e.g., tubular) body. With this arrangement, an upstream portion of the nozzle air passage 114 may have a solid (e.g., non-annular) cross-sectional geometry axially along the nozzle inner wall 120 from the air passage inlet 146 to the body upstream end 128. A downstream portion of the nozzle air passage 114 may have a solid (e.g., non-annular) cross-sectional geometry axially along the nozzle inner wall 120 from body downstream end 130 to the air passage outlet 148. An intermediate portion of the nozzle air passage 114 axially along the center body 118 includes an outer section radially outboard of the center body 118 with an annular cross-sectional geometry, and an inner section radially inboard of the center body 118 with a solid (e.g., non-annular) cross-sectional geometry.

The nozzle outer wall 122 extends axially along the axis 72 to a distal downstream end 150 of the nozzle outer wall 122. This outer wall downstream end 150 may be axially aligned with the nozzle tip 112 and/or the inner wall downstream end 140 along the axis 72. The nozzle outer wall 122 extends radially between and to an inner side 152 of the nozzle outer wall 122 and an outer side 154 of the nozzle outer wall 122. The outer wall inner side 152 of FIG. 3 at least partially or completely forms an outer peripheral boundary of the nozzle fuel passage 116. The nozzle outer wall 122 may also form an outlet 156 (e.g., an outlet orifice) from the nozzle fuel passage 116 at its outer wall downstream end 150 and/or the nozzle tip 112. The outer wall outer side 154 of FIG. 3 may provide a bearing surface 158 for mating with the nozzle guide 70. The injector nozzle 110 and its nozzle outer wall 122 of FIG. 3, for example, project through a bore of the nozzle guide 70, and the nozzle guide 70 may radially engage (e.g., contact) and may be axially slidable along the nozzle outer wall 122. Of course, in other embodiments, it is contemplated a sleeve or other intermediate element may be arranged between the nozzle outer wall 122 and the nozzle guide 70. Referring again to FIG. 3, the nozzle outer wall 122 extends circumferentially around the axis 72 providing the nozzle outer wall 122 with a full-hoop (e.g., tubular) body. The nozzle outer wall 122 is spaced radially outward from the nozzle inner wall 120. At least a portion of the nozzle outer wall 122 axially overlaps and circumscribes the nozzle inner wall 120. With this arrangement, the nozzle fuel passage 116 may have an annular cross-sectional geometry axially along the nozzle inner wall 120 and/or the nozzle outer wall 122.

Figure 6:
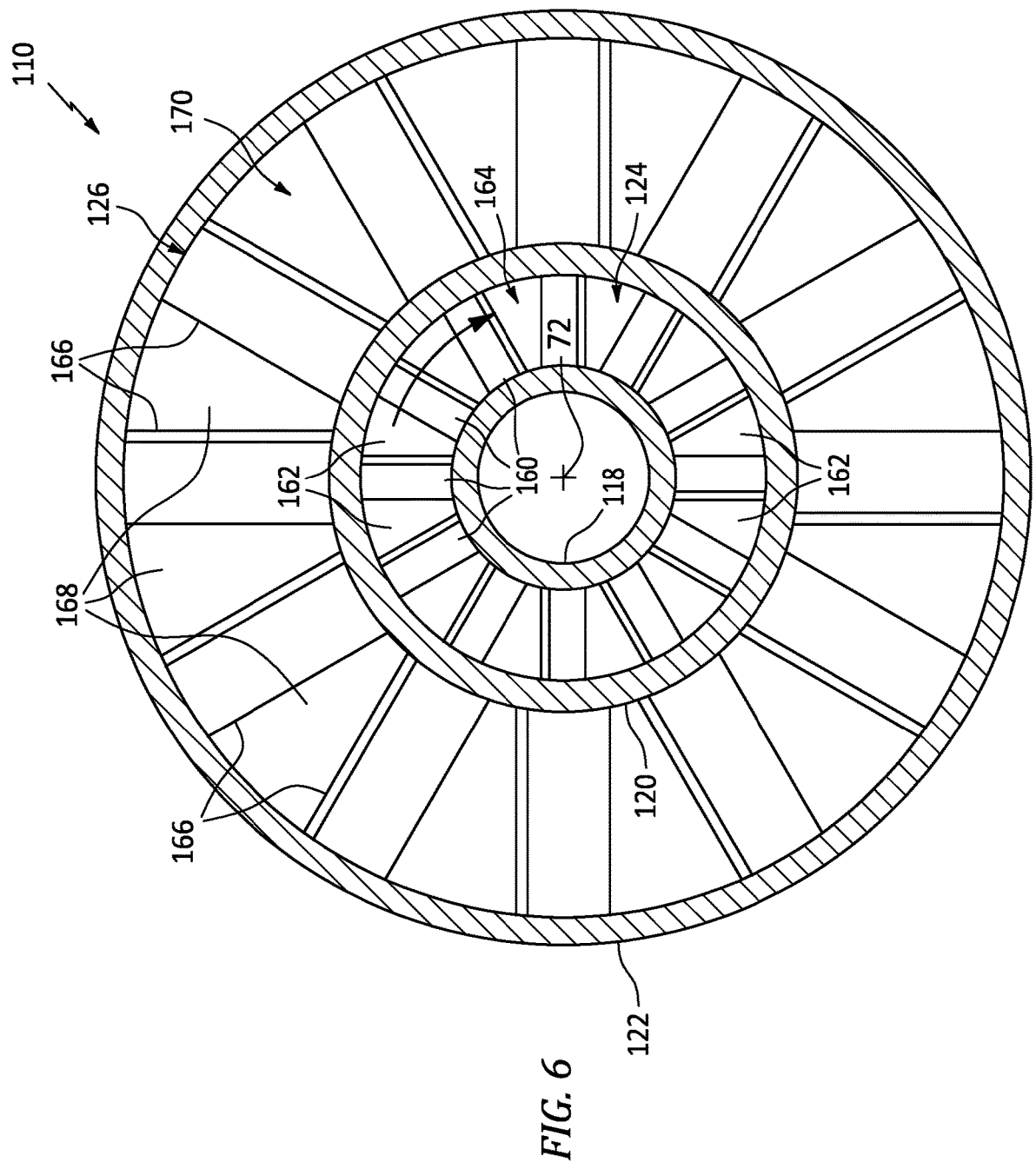
FIG. 6 is a cross-sectional illustration of an injector nozzle.

The inner air swirler 124 may be configured as an axial air swirler. The inner air swirler 124 of FIG. 3, for example, is arranged radially between and is connected to the center body 118 and the nozzle inner wall 120. Referring to FIG. 6, the inner air swirler 124 includes a plurality of inner air swirler vanes 160. Each of these inner air swirler vanes 160 extends radially between and is connected to the center body 118 and the nozzle inner wall 120 (see also FIG. 3). The inner air swirler vanes 160 are arranged circumferentially about the axis 72 in a circular array. Each of the inner air swirler vanes 160 is circumferentially separated from each circumferentially neighboring (e.g., adjacent) inner air swirler vanes 160 by a respective inner air swirler channel 162; e.g., a gap for flowing air. Each inner air swirler channel 162 extends circumferentially between and to a respective circumferentially neighboring pair of the inner air swirler vanes 160. Each inner air swirler channel 162 extends radially between and to the center body 118 and the nozzle inner wall 120. With this arrangement, the inner air swirler channels 162 collectively form an inner air swirler passage 164 axially through the inner air swirler 124, radially between the center body 118 and the nozzle inner wall 120. The inner air swirler vanes 160 and/or the inner air swirler channels 162 are configured such that air passing through and out of the inner air swirler passage 164 is directed in the first circumferential direction (e.g., the clockwise direction, or alternatively the counterclockwise direction) about the axis 72—the same direction as the air swirled by the outer air swirler 88 of FIG. 4. In other words, the inner air swirler vanes 160/the inner air swirler channels 162 are operable to circumferentially swirl the air passing through the inner air swirler 124 in the first circumferential direction.

The fuel swirler 126 may be configured as an axial fuel swirler. The fuel swirler 126 of FIG. 3, for example, is arranged radially between and is connected to the nozzle inner wall 120 and the nozzle outer wall 122. The fuel swirler 126 of FIG. 6 includes a plurality of fuel swirler vanes 166. Each of these fuel swirler vanes 166 extends radially between and is connected to the nozzle inner wall 120 and the nozzle outer wall 122 (see also FIG. 3). The fuel swirler vanes 166 are arranged circumferentially about the axis 72 in a circular array. Each of the fuel swirler vanes 166 is circumferentially separated from each circumferentially neighboring (e.g., adjacent) fuel swirler vane 166 by a respective fuel swirler channel 168; e.g., a gap for flowing fuel. Each fuel swirler channel 168 extends circumferentially between and to a respective circumferentially neighboring pair of the fuel swirler vanes 166. Each fuel swirler channel 168 extends radially between and to the nozzle inner wall 120 and the nozzle outer wall 122. With this arrangement, the fuel swirler channels 168 collectively form a fuel swirler passage 170 axially through the fuel swirler 126, radially between the nozzle inner wall 120 and the nozzle outer wall 122. The fuel swirler vanes 166 and/or the fuel swirler channels 168 are configured such that fuel passing through and out of the fuel swirler passage 170 is directed in the first circumferential direction (e.g., the clockwise direction, or alternatively the counterclockwise direction) about the axis 72—the same direction as the air swirled by the outer air swirler of FIG. 4 and/or the air swirled by the inner air swirler 124 of FIG. 6. In other words, the fuel swirler vanes 166/the fuel swirler channels 168 are operable to circumferentially swirl the fuel passing through the fuel swirler 126 in the first circumferential direction.

During operation of the fuel injector assembly 62 of FIG. 3, air (e.g., the compressed core air from the HPC section of FIG. 1) is directed into the outer air swirler passage 98. This outer air flows radially through the outer air swirler passage 98 and into the inner swirler passage 102. As the outer air passes through the outer air swirler 88 and its outer air swirler passage 98, the outer air is swirled in the first circumferential direction (see FIG. 4). The outer air directed through the outer air swirler 88 into the inner swirler passage 102 is therefore (or otherwise includes) swirled outer air. This swirled outer air is directed axially through the inner swirler passage 102 and is discharged from the swirler assembly 66 through the inner swirler outlet 104. The swirler assembly 66 may thereby inject the swirled outer air as an annular outer air flow of the swirled outer air along the axis 72 into the combustion chamber 58.

Additional air (e.g., the compressed core air from the HPC section of FIG. 1) is directed into the nozzle air passage 114 through the air passage inlet 146. This inner air flows axially through the inner air swirler 124 as well as the inner bore 136 (when included in the center body 118). As the inner air passes through the inner air swirler 124 and its inner air swirler passage 164, the inner air is swirled in the first circumferential direction (see FIG. 6). The inner air directed through and discharged from the inner air swirler 124 is therefore (or otherwise includes) swirled inner air. This swirled inner air is directed axially through a remainder of the nozzle air passage 114 and is discharged from the injector nozzle 110 through the air passage outlet 148. The injector nozzle 110 may thereby inject the swirled inner air as an annular inner air flow of the swirled inner air along the axis 72 into the combustion chamber 58. A jet of the inner air (the inner air that passes through the inner bore 136) may also be injected into the combustion chamber 58 through the air passage outlet 148. Here, the swirled inner air is radially outboard and adjacent as well as circumscribes (and swirls about) the jet of the inner air. Providing the swirled inner air may facilitate configuring the air passage outlet 148 as a diffuser outlet with a relatively large half cone angle without stall; e.g., up to a twenty-five degree (25°) half cone angle, compared to less than roughly a seven degree (7°) half angle for an outlet with no swirling air flow. Providing such a diffuser outlet may facilitate providing the injector nozzle 110 with a relatively sharp tip; e.g., a tip height of about 0.001 inch provided to prevent (or reduce likelihood of) unwanted flame holding for Hydrogen fuel injection.

Fuel is directed into the nozzle fuel passage 116 and flows axially through the fuel swirler passage 170. As the outer passage fuel passes through the fuel swirler 126 and its fuel swirler passage 170, the fuel is swirled in the first circumferential direction (see FIG. 6). The fuel directed through and discharged from the fuel swirler 126 is therefore (or otherwise includes) swirled fuel. This swirled fuel is directed axially through a remainder of the nozzle fuel passage 116 and is discharged from the injector nozzle 110 through the fuel passage outlet 156. The injector nozzle 110 may thereby inject the swirled fuel as an annular fuel flow of the swirled fuel along the axis 72 into the combustion chamber 58.

In general, the annular inner air flow is radially inboard of and radially adjacent (and in contact with) the annular fuel flow. The annular fuel flow may thereby (e.g., at least substantially) circumscribe the annular inner air flow. A trajectory 172 of at least a bulk (e.g., at least 60, 70 or 80%) of the annular inner air flow and a trajectory 174 of at least a bulk (e.g., at least 60, 70 or 80%) of the annular fuel flow at and/or downstream of the nozzle tip 112 may also be substantially (e.g., within +/−5°, 10° or 15°) or completely parallel with one another/the axis 72 when viewed, for example, in a reference plane parallel with (e.g., that includes) the axis 72. More particularly, although the annular inner air flow and the annular fuel flow may have different (or the same) circumferential (swirl) components, both the annular inner air flow trajectory 172 and the annular fuel flow trajectory 174 may each substantially (or only) otherwise include an axial component—not a radial component. In other words, neither the bulk of the annular inner air flow and its trajectory 172 nor the bulk of the annular fuel flow and its trajectory 174 may be directed radially inward towards the axis 72 or radially outward away from the axis 72 like a traditional inward or outward cone spray pattern. In addition, the annular fuel flow is radially inboard of and radially adjacent (and in contact with) the annular outer air flow. The annular outer air flow may thereby (e.g., at least substantially) circumscribe the annular fuel flow.

Some of the swirled inner and outer air (generally referred to as "swirled air") and some of the swirled fuel may begin to mix together as soon as the swirled fuel enters the inner swirler passage 102. However, this mixing (at least proximate the nozzle tip 112 and/or within the inner swirler passage 102) may be relatively low turbulence mixing since the swirled air and the swirled fuel are swirled in the common first circumferential direction (see FIGS. 4 and 6). The mixing between the swirled air and the swirled fuel may thereby be pushed further downstream into the combustion chamber 58. In other words, the swirled air and the swirled fuel may penetrate further downstream into the combustion chamber 58 before substantial mixing occurs. Delaying the mixing between the swirled air and the swirled fuel may reduce likelihood of flashback and/or flame holding on the injector nozzle 110 due to reduced turbulent flame speed. This may be particularly useful where the fuel is a non-hydrocarbon fuel such as a hydrogen fuel (e.g., gaseous hydrogen) with a relatively fast burn speed as compared to traditional hydrocarbon fuel such as kerosene and jet fuel. However, the swirling of the air and the fuel may still facilitate (e.g., substantially complete) mixing and burning of the air and the fuel within the combustion chamber 58 by generating a separation zone to provide flame anchoring, stable burning and/or improved mixing. In addition, by locating the swirled fuel further away from the axis 72, the fuel injector 68 may be provided with a relatively wide range of Wobbe index and turn down ratio as well as facilitate a lower tip pressure drop.

The nozzle fuel passage 116 of FIG. 3 may receive the fuel from a fuel source 176. This fuel source 176 may be a hydrogen gas ($H_2$ gas) fuel source. However, it is contemplated the fuel source 176 may alternatively store and provide another type of fuel to the injector nozzle 110 and its nozzle fuel passage 116. The fuel source 176, for example, may alternatively be another type of non-hydrocarbon fuel source or a hydrocarbon fuel source. The fuel source 176 of FIG. 3 includes a reservoir 178 and/or a regulator 180 (e.g., a valve and/or a pump), where the regulator 180 may regulate a flow of the fuel from the reservoir 178 to the injector nozzle 110 and its nozzle fuel passage 116. Examples of the reservoir 178 include, but are not limited to, a tank, a pressure vessel, a cylinder, a bladder and/or any other type of container.

Figure 7C:
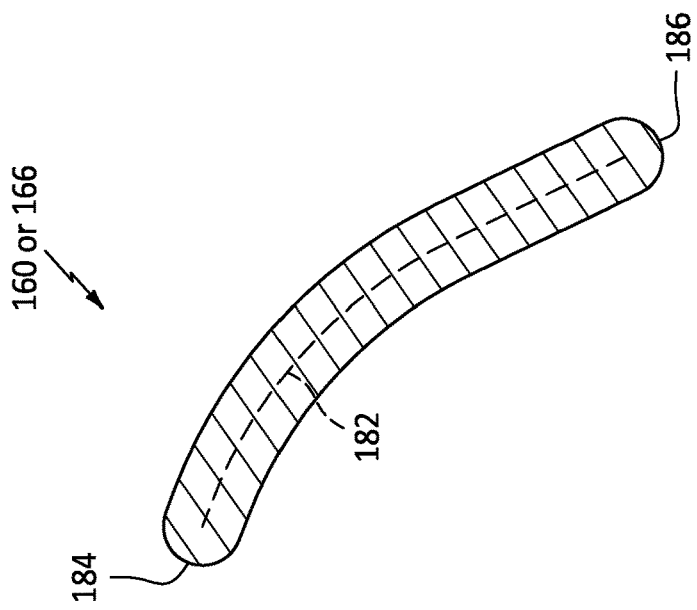
FIGS. 7A-C are plan view illustrations of various swirler vane configurations.
Figure 7B:
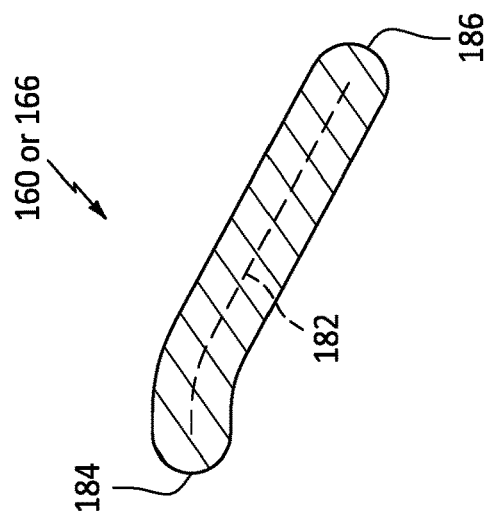
Figure 7A:
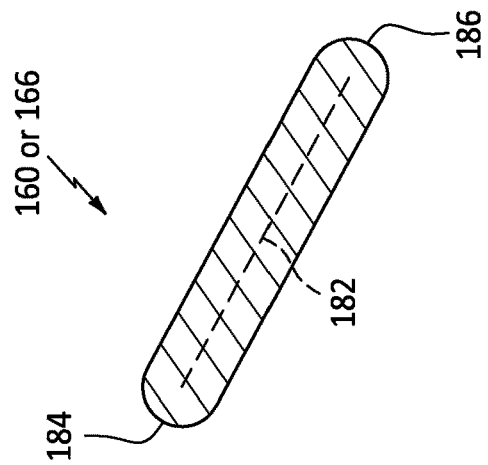

Referring to FIGS. 7A-C, each of the swirler vanes 160, 166 has a camber line 182 extending from a leading edge 184 of that swirler vane 160, 166 to a trailing edge 186 of that swirler vane 160, 166. In some embodiments, referring to FIG. 7A, the camber line 182 of one, some or all of the swirler vanes 160, 166 may be straight from the leading edge 184 to the trailing edge 186. In other embodiments, referring to FIGS. 7B and 7C, the camber line 182 of one, some or all of the swirler vanes 160, 166 may be non-straight from the leading edge 184 to the trailing edge 186. For example, at least a portion or an entirety of the camber line 182 may be curved; e.g., arcuate, splined, etc. In some embodiments, referring to FIG. 8, one or more or all of the swirler vanes 160, 166 may also be configured as a helical vane.

Figure 9:
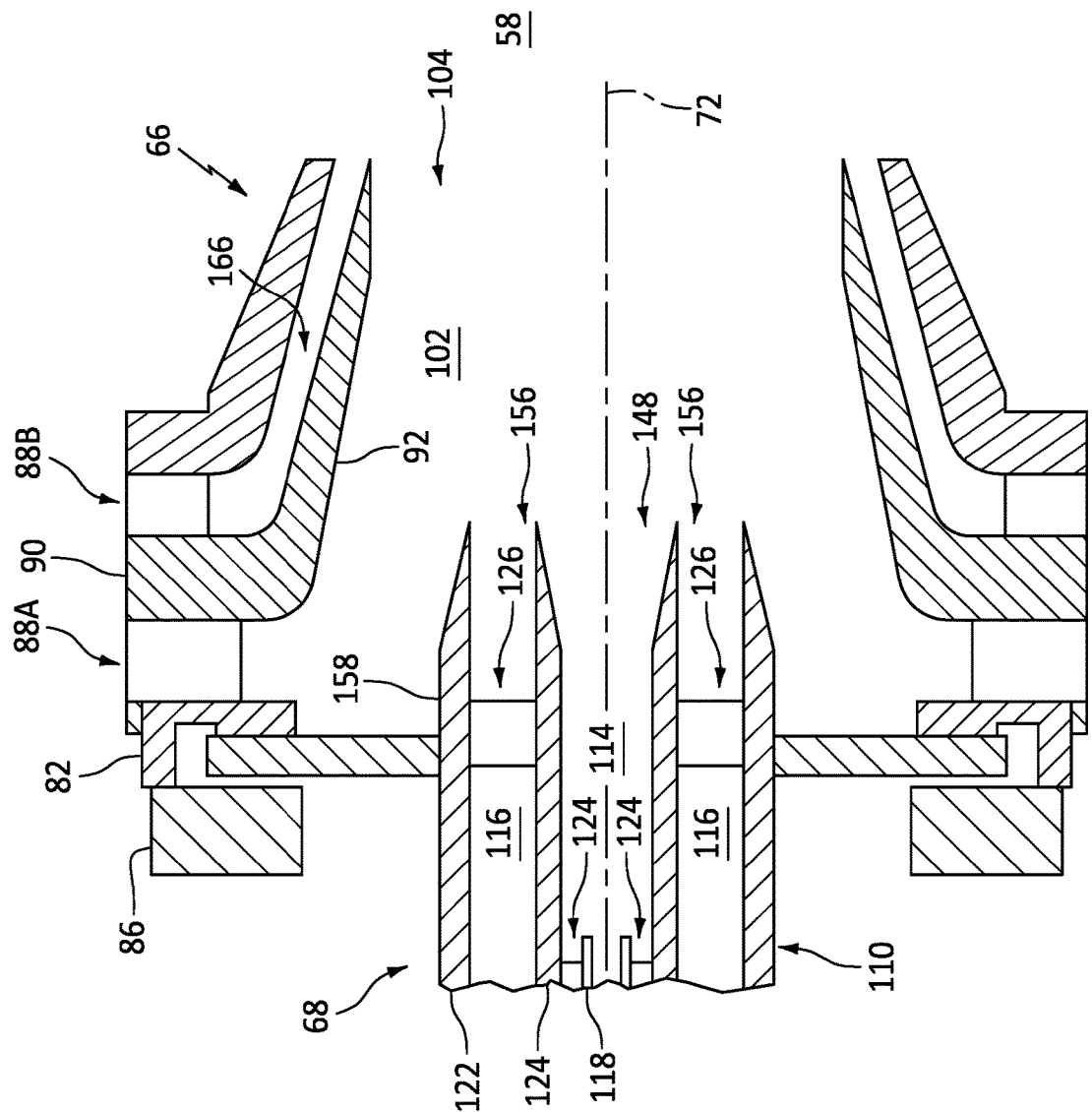
FIG. 9 is a partial side sectional illustration of the fuel injector assembly of FIG. 2 configured with an additional air swirler.

In some embodiments, referring to FIG. 3, the swirler assembly 66 may be configured with a single outer air swirler 88. In other embodiments, referring to FIG. 9, the air swirler may alternatively be one of a plurality of air swirlers 88A and 88B (generally referred to as "88"). In the embodiment of FIG. 9, the second outer air swirler 88B may directed swirled air into an outer swirler passage 166 that circumscribes and extends along the swirler guide wall 92. It is contemplated this second outer air swirler 88B may swirl the air in the first circumferential direction (e.g., a common direction as the first outer air swirler 88A), or in a second circumferential direction about the axis 72 that is opposite the first circumferential direction.

Figure 10:
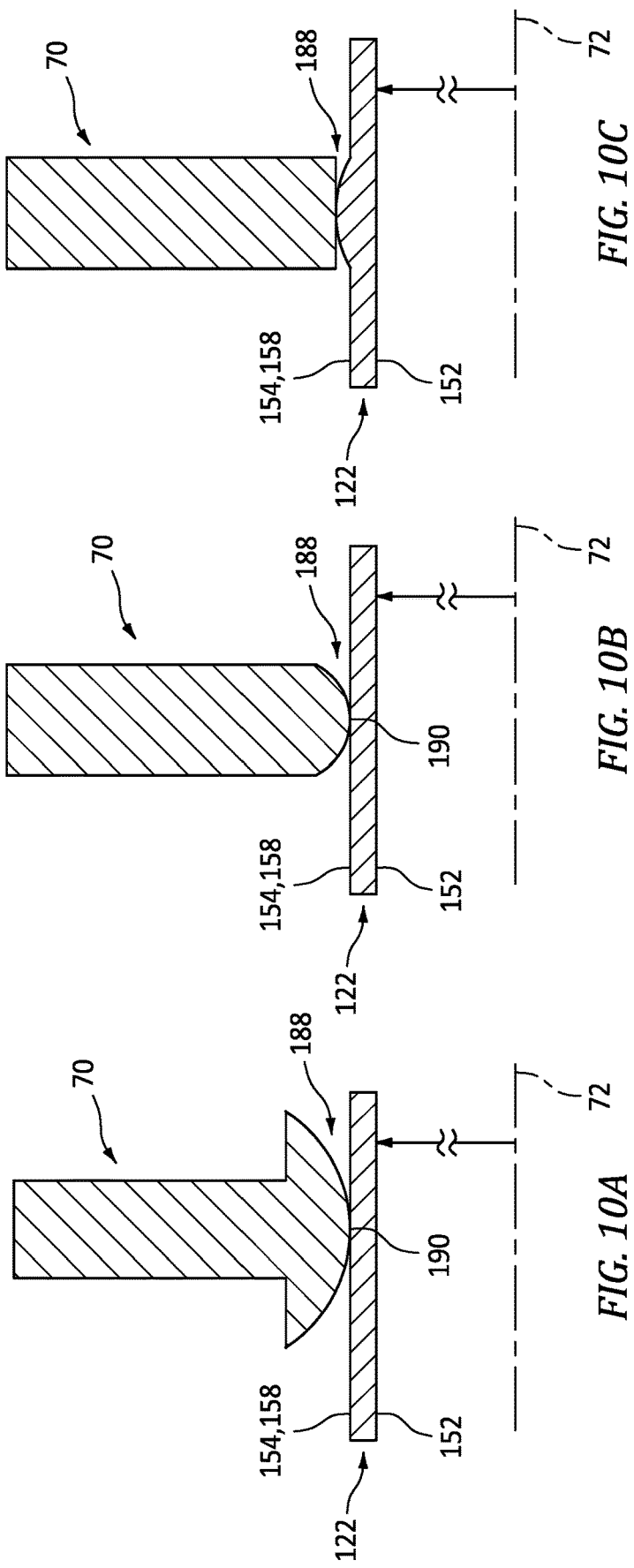
FIGS. 10A-C are partial side sectional illustrations of the fuel injector assembly with various interfaces between an injector mount and a nozzle outer wall.

In some embodiments, referring to FIGS. 10A and 10B, the nozzle guide 70 may be configured with a foot 188 to facilitate axial movement between the nozzle guide 70 and the bearing surface 158. This foot 188 may include a surface 190 with a curved (e.g., arcuate) or otherwise eased sectional geometry when viewed, for example, in a reference plane including or otherwise parallel with the axis 72. In other embodiments, referring to FIG. 10C, the foot 188 may be configured with the nozzle outer wall 122.

Figure 11:
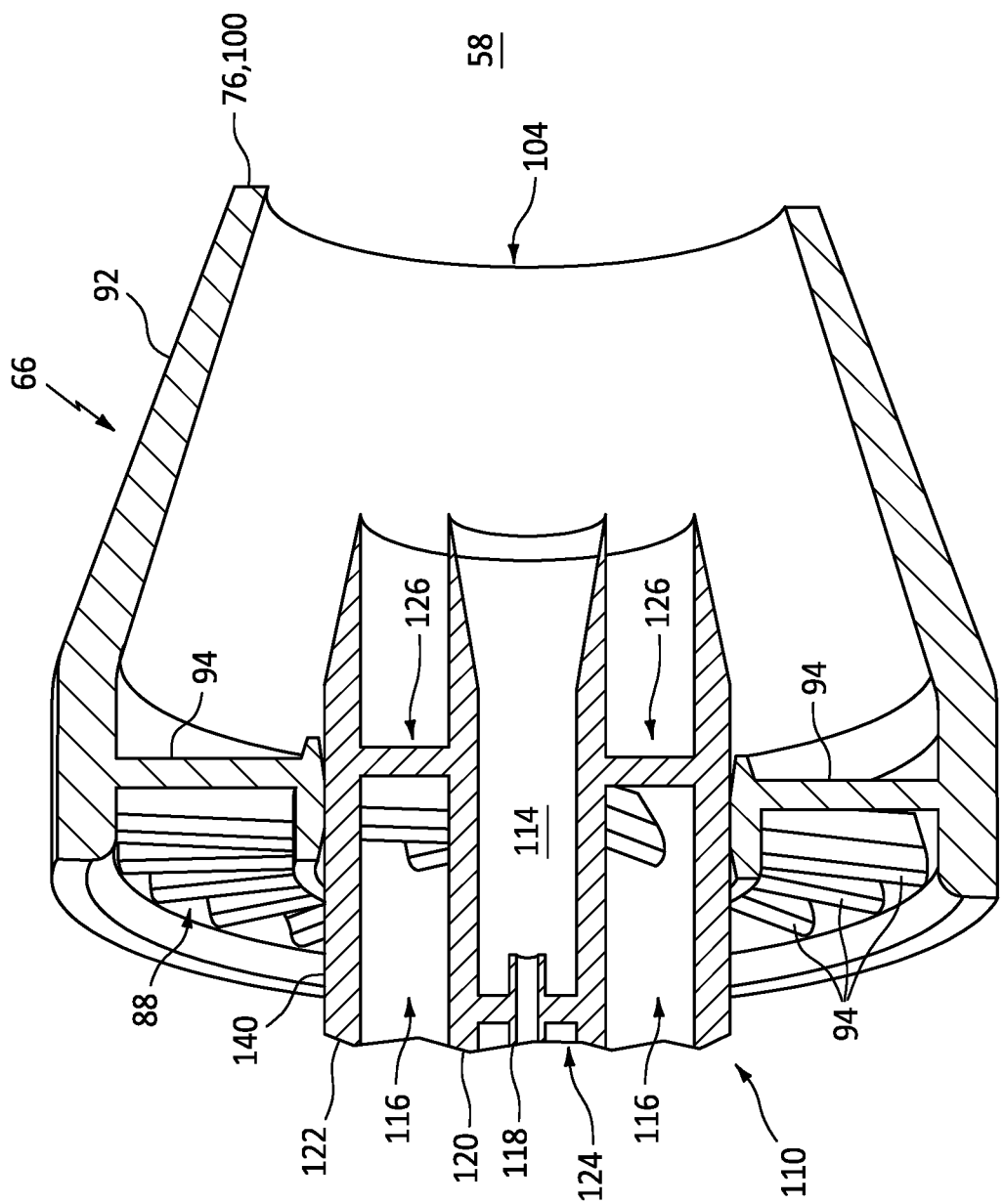
FIG. 11 is a cutaway perspective illustration of the fuel injector assembly with an axial air swirler.

In some embodiments, referring to FIGS. 3 and 9, each outer air swirler 88 may be configured as a radial air swirler. However, in other embodiments, it is contemplated any one or more of the outer air swirlers 88 may alternatively be configured as an axial air swirler; e.g., see FIG. 11.

The fuel injector assembly(ies) 62 may be included in various turbine engines other than the one described above. The fuel injector assembly(ies) 62, for example, may be included in a geared turbine engine where a geartrain connects one or more shafts to one or more rotors in a fan section, a compressor section and/or any other engine section. Alternatively, the fuel injector assembly(ies) 62 may be included in a direct drive turbine engine configured without a geartrain. The fuel injector assembly(ies) 62 may be included in a turbine engine configured with a single spool, with two spools (e.g., see FIG. 1), or with more than two spools. The turbine engine may be configured as a turbofan engine, a turbojet engine, a turboprop engine, a turboshaft engine, a propfan engine, a pusher fan engine or any other type of turbine engine. The turbine engine may alternatively be configured as an auxiliary power unit (APU) or an industrial gas turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:
a hydrogen fuel source; and
a fuel injector configured to receive hydrogen fuel from the hydrogen fuel source, the fuel injector including an air passage, a fuel passage and a fuel swirler within the fuel passage;
the air passage extending axially along an axis within the fuel injector to an air passage outlet, and the air passage configured to direct inner air out of the fuel injector through the air passage outlet;
the fuel swirler configured to swirl the hydrogen fuel to provide swirled hydrogen fuel;
the fuel passage extending axially along the axis within the fuel injector to a fuel passage outlet, the fuel passage configured to direct the swirled hydrogen fuel out of the fuel injector through the fuel passage outlet, and the fuel passage radially adjacent and circumscribing the air passage, wherein a downstream end of the fuel swirler is axially spaced from the fuel passage outlet along the axis;
the air passage configured to direct the inner air out of the fuel injector through the air passage outlet along a first trajectory; and
the fuel passage configured to direct the swirled hydrogen fuel out of the fuel injector through the fuel passage outlet along a second trajectory that is substantially parallel with the first trajectory when viewed in a plane parallel with the axis.

2. The assembly of claim 1, wherein
the fuel injector further includes an inner air swirler;
the inner air swirler is configured to swirl the inner air to provide swirled inner air; and
the air passage is configured to direct the swirled inner air out of the fuel injector through the air passage outlet.

3. The assembly of claim 1, wherein the first trajectory and the second trajectory are substantially parallel with the axis.

4. The assembly of claim 1, wherein the fuel swirler comprises an axial fuel swirler.

5. The assembly of claim 1, wherein the fuel injector further comprises an air swirler within the air passage.

6. The assembly of claim 5, wherein the air swirler comprises an axial air swirler.

7. The assembly of claim 5, wherein
the fuel injector further includes a center body and a nozzle wall circumscribing the center body; and
the air swirler includes a plurality of air swirler vanes arranged circumferentially about the axis, and each of the plurality of air swirler vanes extends radially from the center body to the nozzle wall.

8. The assembly of claim 7, wherein an inner bore extends axially through the center body.

9. The assembly of claim 7, wherein a camber line of a first of the plurality of air swirler vanes is straight.

10. The assembly of claim 7, wherein at least a portion of a camber line of a first of the plurality of air swirler vanes is curved.

11. The assembly of claim 1, wherein
the fuel injector further includes a nozzle inner wall and a nozzle outer wall circumscribing the nozzle inner wall; and
the fuel swirler includes a plurality of fuel swirler vanes arranged circumferentially about the axis, and each of the plurality of fuel swirler vanes extends radially from the nozzle inner wall to the nozzle outer wall.

12. The assembly of claim 11, wherein a camber line of a first of the plurality of fuel swirler vanes is straight.

13. The assembly of claim 11, wherein at least a portion of a camber line of a first of the plurality of fuel swirler vanes is curved.

14. The assembly of claim 1, further comprising:
a fuel injector assembly including the fuel injector and an outer air swirler configured to swirl outer air in the direction about the axis to provide outer swirled air;
the fuel injector assembly configured to inject the outer swirled air as an annular outer air flow along the axis.

15. The assembly of claim 14, wherein the outer air swirler comprises a radial air swirler.

16. The assembly of claim 14, wherein
the fuel injector assembly further includes a first swirler wall and a second swirler wall; and
the outer air swirler includes a plurality of air swirler vanes arranged circumferentially about the axis, and each of the plurality of air swirler vanes extends axially from the first swirler wall to the second swirler wall.

\* \* \* \* \*